(12) United States Patent
Yeh et al.

(10) Patent No.: US 12,528,273 B2
(45) Date of Patent: Jan. 20, 2026

(54) SILICONE ELASTOMER, AND MANUFACTURING METHOD THEREOF

(71) Applicant: GENERAL SILICONES CO., LTD., Hsinchu (TW)

(72) Inventors: Hsiu-pang Yeh, Tainan (TW); Yen-tu Yang, Hsinchu (TW); Hao-yang Yang, Taoyuan (TW); Anupam Mukherjee, Hsinchu (TW)

(73) Assignee: GENERAL SILICONES CO., LTD., Hsinchu (TW)

( * ) Notice: Subject to any disclaimer, the term of this patent is extended or adjusted under 35 U.S.C. 154(b) by 867 days.

(21) Appl. No.: 15/734,218

(22) PCT Filed: Aug. 10, 2018

(86) PCT No.: PCT/CN2018/099971
§ 371 (c)(1),
(2) Date: Dec. 1, 2020

(87) PCT Pub. No.: WO2019/232924
PCT Pub. Date: Dec. 12, 2019

(65) Prior Publication Data
US 2021/0187916 A1   Jun. 24, 2021

(30) Foreign Application Priority Data
Jun. 5, 2018   (CN) .......................... 201810568629.4

(51) Int. Cl.
*B32B 25/08*   (2006.01)
*B32B 7/12*   (2006.01)
(Continued)

(52) U.S. Cl.
CPC ................ *B32B 25/08* (2013.01); *B32B 7/12* (2013.01); *B32B 25/20* (2013.01); *B32B 27/40* (2013.01);
(Continued)

(58) Field of Classification Search
CPC .......... B32B 25/08; B32B 7/12; B32B 25/20; B32B 27/40; B32B 37/24;
(Continued)

(56) References Cited

U.S. PATENT DOCUMENTS 4,164,491 A   8/1979   Itoh et al.
5,147,725 A   9/1992   Pinchuk
(Continued)

FOREIGN PATENT DOCUMENTS

CN   101598529 A   12/2009
CN   103522693 A   1/2014
(Continued)

OTHER PUBLICATIONS

Machine translation of WO 2016/132921 A1 (Year: 2016).*
(Continued)

*Primary Examiner* — Callie E Shosho
*Assistant Examiner* — Steven A Rice
(74) *Attorney, Agent, or Firm* — Huan-Yi Lin

(57) ABSTRACT

A silicone elastomer, comprising: a first layer, being polyurethane; a second layer, being silicone rubber; and a intermediate layer, respectively coated on an end surface of the first layer and the second layer and provided between the first layer and the second layer, the intermediate layer respectively undergoing addition reaction and curing with the first layer and the second layer such that the intermediate layer respectively combines with the first layer and the second layer firmly. An end surface of the first layer is combined with a substrate. The substrate is a textile material or a conductive material. The substrate may be hydrophilic, hydrophobic, anti-bacterial, or conductive and may be suitable for circuit printing, digital printing or film coating.

12 Claims, 2 Drawing Sheets

(51) Int. Cl.
  *B32B 25/20* (2006.01)
  *B32B 27/40* (2006.01)
  *B32B 37/24* (2006.01)
  *C08J 5/12* (2006.01)

(52) U.S. Cl.
  CPC .............. *B32B 37/24* (2013.01); *C08J 5/121* (2013.01); *B32B 2037/243* (2013.01); *B32B 2255/10* (2013.01); *B32B 2319/00* (2013.01); *B32B 2375/00* (2013.01); *C08J 2375/04* (2013.01); *C08J 2383/04* (2013.01)

(58) Field of Classification Search
  CPC .......... B32B 2037/243; B32B 2255/10; B32B 2319/00; B32B 2375/00; B32B 27/12; B32B 2250/02; B32B 2250/03; B32B 2457/08; B32B 2255/26; B32B 2307/51; B32B 2307/7145; B32B 2307/728; B32B 2307/73; B32B 33/00; B32B 37/12; B32B 27/08; B32B 38/164; B32B 37/06; C08J 5/121; C08J 2375/04; C08J 2383/04; G01L 1/00
  USPC ...................................................... 428/425.5
  See application file for complete search history.

(56) References Cited

U.S. PATENT DOCUMENTS

| | | | |
|---|---|---|---|
| 5,238,708 A * | 8/1993 | Blizzard | ................ C08J 7/0427 427/322 |
| 5,677,007 A | 10/1997 | Tsai | |
| 6,290,892 B1 | 9/2001 | Tsai et al. | |

FOREIGN PATENT DOCUMENTS

| | | | | |
|---|---|---|---|---|
| CN | 103948960 A | 7/2014 | | |
| CN | 105814254 A | 7/2016 | | |
| CN | 107538838 A | 1/2018 | | |
| CN | 107820432 A | 3/2018 | | |
| CN | 107922798 A | 4/2018 | | |
| CN | 108859347 A | 11/2018 | | |
| DE | 102011086103 A1 | 5/2013 | | |
| EP | 0262969 A2 | 4/1998 | | |
| WO | WO-2016132921 A1 * | 8/2016 | ............. | B32B 25/08 |

OTHER PUBLICATIONS

CFMats, "Vinyl Silanes", Jan. 14, 2019, p. 1, at https://web.archive.org/web/20190114010207/https://www.cfmats.com/functional-silanes/vinyl-silanes/ (Year: 2019).*

Cfmats, "Epoxy Silanes", Sep. 24, 2020, p. 1, at https://web.archive.org/web/20200924211129/https://www.cfmats.com/functional-silanes/epoxy-silanes/ (Year: 2020).*

International Search Report and Written Opinion mailed on Jan. 30, 2019 in International Patent Application No. PCT/CN2018/099971, filed on Aug. 10, 2018.

Taiwan office action issued in TW 107118941 dated on Jan. 7, 2019.

European search report issued in EP18922003.1 dated Feb. 1, 2022.

Chinese office action issued in CN201810568629.4 dated on Jan. 5, 2021.

* cited by examiner

SILICONE ELASTOMER, AND MANUFACTURING METHOD THEREOF

FIELD OF THE INVENTION

The present invention is related to a type of elastomer and manufacturing method thereof; particularly, a type of silicone elastomer applicable to hydrophilic or hydrophobic materials, anti-bacterial materials, conductive materials, as well as the fields of circuit printing, digital printing or film coating.

BACKGROUND OF THE INVENTION

German patent number DE102011086103A1 titled "Silicone rubber on hotmelt adhesive" discloses a double-layer film comprising: (A) a first layer of silicone rubber; and (B) a hot melt adhesive film. The conditions for said double-layer film are: (i) the adhesive force between (A) and (B) is at least 50N/5 cm; (ii) softening temperature of (B) is between 80-200° C., and (iii) the double-layer film being a double-layer product having elasticity of extension at break of at least 1% according to the standards of ISO 53530.

Although the aforementioned prior art discloses an adhesive force being at least 50N/5 cm; however, the adhesive force is still insufficient for actual industrial applications. Furthermore, the double-layer film disintegrates easily due to the characteristic of its physical structure, which is disadvantageous for the following manufacturing processes and applications. This drawback is needed to be remedied.

U.S. Pat. No. 5,147,725A discloses "Method for bonding silicone rubber and polyurethane materials and articles manufactured thereby". The disadvantage of said patent resides in that halogen biproducts may be produced during the manufacturing process and may cause environmental contamination, which is not desirable for industrial applicability.

SUMMARY OF THE INVENTION

In order to resolve the above-mentioned problems in the prior arts, the present invention provides a silicone elastomer, comprising: a first layer, being polyurethane; a second layer, being silicone rubber; and an intermediate layer, coated on an end surface of the first layer and the second layer and provided between the first layer and the second layer. The intermediate layer undergoes an addition reaction respectively with the first layer and the second layer and undergoes curing, so the intermediate layer is respectively bonded firmly with first layer and the second layer. Another end surface of the first layer is combined with a substrate. The substrate is a textile material or a conductive material. The substrate may be hydrophilic, hydrophobic, anti-bacterial, or conductive and may be suitable for circuit printing, digital printing or film coating.

Preferably, the intermediate layer is cured via thermal curing or photo-curing.

Preferably, an adhesive force between the first layer and the second layer is from 50N/5 cm to 300N/5 cm.

A manufacturing method for the silicone elastomer comprises the steps of: coating an intermediate layer on a first layer, the intermediate layer and the first layer being placed in a curing apparatus to cure the intermediate layer; the intermediate layer and the first layer undergoing an addition reaction to bond the first layer with the intermediate layer; stacking a second layer on the intermediate layer, curing the second layer in the curing apparatus; and the intermediate layer and the second layer undergoing an addition reaction to bond the second layer with the intermediate layer.

Preferably, the curing apparatus is a thermal curing apparatus or a photo-curing apparatus.

Preferably, the thermal curing apparatus is provided with a predetermined temperature, the predetermined temperature is from 80° C. to 200° C.

DETAILED DESCRIPTION OF THE PREFERRED EMBODIMENTS

Figure 1:
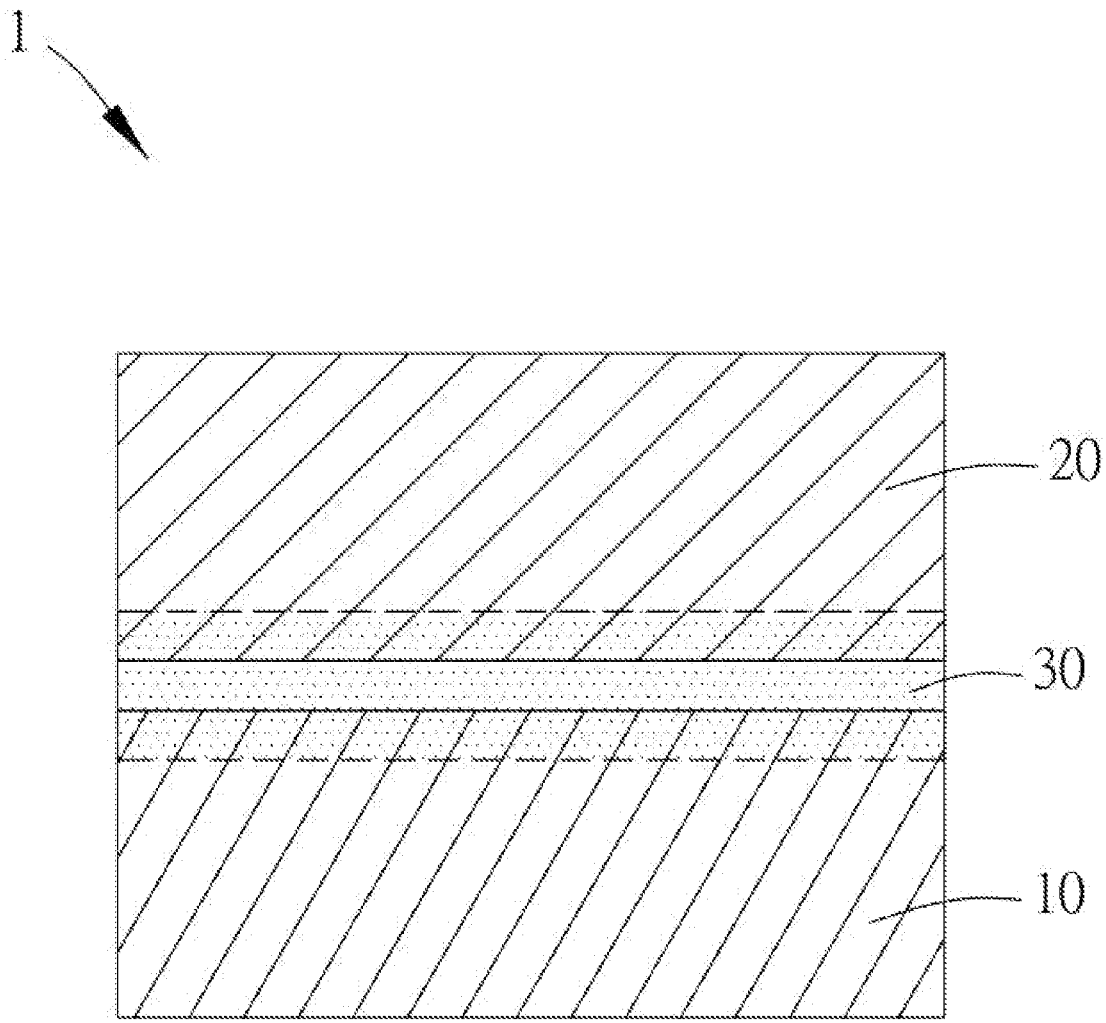
FIG. 1 is a structure schematic of the present invention.
Figure 2:
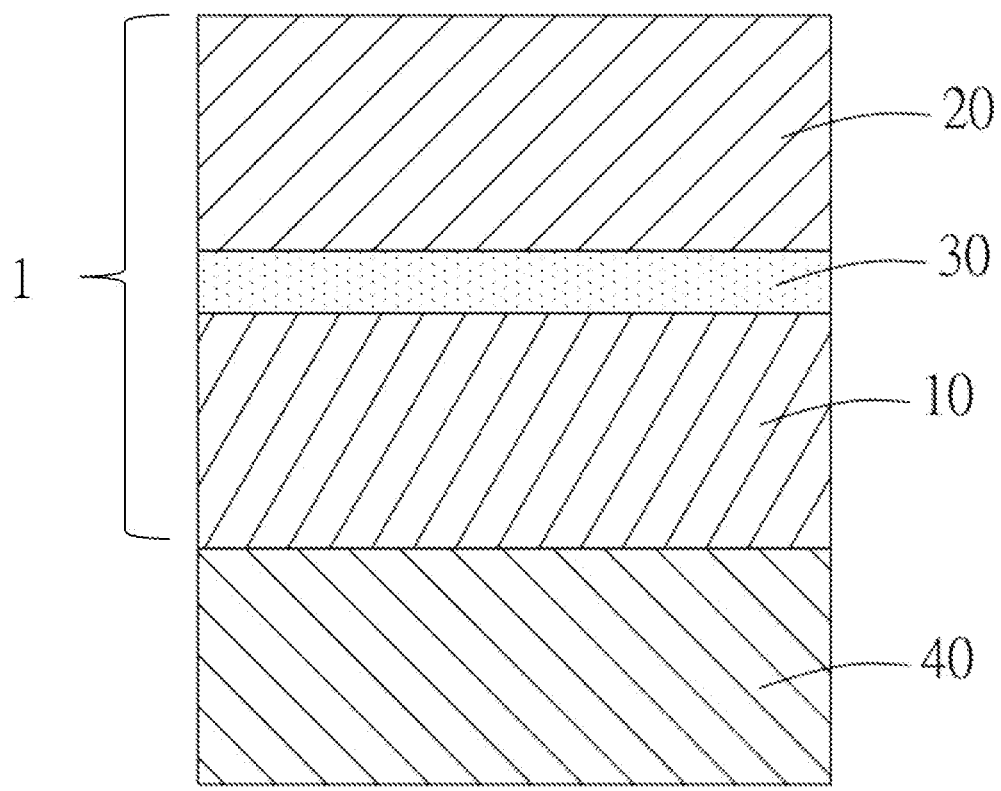
FIG. 2 is a schematic of the present invention when in use.

As shown in FIG. 1 and FIG. 2, a silicone elastomer 1 in accordance with the present invention comprises a first layer 10; a second layer 20; and an intermediate layer 30.

The first layer 10 is polyurethane, polyurethane (PU) having a functional group comprising: isocyanate group, or polyalcohol (hydroxyl Group).

The second layer 20 is a silicone rubber having a functional group comprising: SiH or —CH=CH$_2$. An intermediate layer 30 is provided between the second layer 20 and the first layer 10; the intermediate layer 30 is self-crosslinking with: silane, acrylic acid, methyl acrylate, or acrylic acid ethyl ester.

The intermediate layer 30 is cured via thermal curing or photo-curing. The intermediate layer 30 respectively undergoes an addition reaction with the first layer 10 and the second layer 20, so the intermediate layer 30 respectively bonds with the first layer 10 and the second layer 20 firmly. The adhesive force between the first layer 10, and the second layer 20 from 50 N/5 cm to 300 N/5 cm.

The double bond of C=N in the isocyanate functional group in the first layer 10 is highly active and can undergo autopolymerization to form a dimer or a trimer. The double bond can also undergo addition reaction with functional group containing active hydrogen such as water, alcohol, phenol, acid, or amine. The order activities of the chemicals in the functional group are as the following (Ar represents aryl functional group):

$RNH_2 > R_2NH > ArNH_2 > RCH_2OH > H_2O > R_2CHOH > R_3COH > ArOH > RCOOH > RNCO$

The first layer 10 contains isocyanate group; the intermediate layer 30 thus can crosslink with the first layer 10 via the aforementioned functional group.

One of the mechanisms for cross-linking the intermediate layer 30 with the second layer 20 is as follows: an addition reaction is carried between the SiH functional group and the double bond; the reaction condition and speed is controlled by the usage of platinum catalyst; therefore, the second layer 20 can cross-link with the intermediate layer 30 via SiH functional group or double bond functional group.

According to the silicone elastomer 1 of the present invention, when used, an end surface of the first layer 10 is attached to a substrate 40 via thermal lamination (but not limited to this method). The substrate 40 is, but not limited to, textile material or conductive material. And the substrate may be hydrophilic or hydrophobic materials, anti-bacterial materials, or conductive materials, and may be suitable for circuit printing, digital printing, or film coating.

A method for manufacturing silicone elastomer comprises the following steps: coating an intermediate layer 30 on a first layer 10, the intermediate layer 30 and the first layer 10 being placed in a curing apparatus to cure the intermediate layer 30, meanwhile, the intermediate layer 30 and the first layer 10 undergoing an addition reaction in the curing apparatus to bond the first layer 10 with the intermediate layer 30; taking out the intermediate layer 30 and the first layer 10 and stacking a second layer 20 on the intermediate layer 30; curing the second layer 20 in the curing apparatus; and the intermediate layer 30 and the second layer 20 undergoing an addition reaction to bond the second layer 20 with the intermediate layer 30.

After completing the addition reaction between the intermediate layer 30 and the first layer 10 in the curing apparatus, another side of the intermediate layer 30 is still adhesive and is able to bond with the second layer 20. The intermediate layer 30 and the second layer 20 are cured again in the curing apparatus.

The curing apparatus is a thermal curing apparatus or a photo-curing apparatus. When the thermal curing apparatus is used, thermal curing apparatus is provided with a predetermined temperature, the thermal curing apparatus is heated with predetermined temperature of 80° C. to 200° C.

More specifically, the present invention can be obtained from the following methods.

In one embodiment, the present invention utilizes siloxane functional group condensation polymerization to achieve self-crosslinking reaction of the intermediate layer 30. 1% (weight percentage) and 25% (weight percentage) of trimethoxy (vinyl) silane (CAS: 2768 Feb. 7) and (3-Glycidyloxypropyl) triMethoxysilane (CAS: 2530-83-8) are respectively dissolved in an organic solution. Appropriate and small amount of cross-linking catalysis is added to complete preparing the intermediate layer 30 original solution. The intermediate layer 30 original solution is diluted with appropriate ratio and coated on the first layer 10. The first layer 10 is baked in the curing apparatus with preheated temperature of 90° C. for 5 minutes to complete crosslinking reaction of the intermediate layer 30 and the first layer 10; and to evaporate the solvent in the intermediate layer 30. The second layer 20 is stacked on the intermediate layer 30; the second layer 20 and the intermediate layer 30 is baked in the curing apparatus with preheated temperature of 110° C. for 3 minutes to complete crosslinking reaction of the intermediate layer 30 and the second layer 20, and to cure the second layer 20. The adhesive force between the first layer 10 and the second layer 20 is from 55N/5 cm to 65N/5 cm.

In a preferred embodiment, the present invention utilizes siloxane functional group condensation polymerization to achieve self-crosslinking reaction of the intermediate layer 30. 3% (weight percentage) and 25% (weight percentage) of trimethoxy (vinyl) silane (CAS: 2768 Feb. 7) and (3-Glycidyloxypropyl) triMethoxysilane (CAS: 2530-83-8) are respectively dissolved in an organic solution. Appropriate and small amount of cross-linking catalysis is added to complete preparing the intermediate layer 30 original solution. The intermediate layer original solution is diluted with appropriate ratio and coated on the first layer 10. The first layer 10 is baked in the curing apparatus with preheated temperature of 130° C. for 5 minutes to complete crosslinking reaction of the intermediate layer 30 and the first layer 10, and to evaporate the solvent in the intermediate layer 30. The second layer 20 is stacked on the intermediate layer 30; the second layer 20 and the intermediate layer 30 is baked in the curing apparatus with preheated temperature of 110° C. for 3 minutes to complete crosslinking reaction of the intermediate layer 30 and the second layer 20, and to cure the second layer 20. The adhesive force between the first layer 10 and the second layer 20 is from 90N/5 cm to 110N/5 cm.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A silicone elastomer, comprising:
    a first layer, comprising a functional group that comprises an isocyanate group or polyalcohol;
    a second layer, being silicone rubber; and
    an intermediate layer, provided between the first layer and the second layer, the intermediate layer self-crosslinking with silane, acrylic acid, methyl acrylate, or acrylic acid ethyl ester; and
    wherein the intermediate layer comprises 2%-3% (weight percentage) of trimethoxy (vinyl) silane (CAS: 2768 Feb. 7) and approximately 25% (weight percentage) of (3-glycidyloxypropyl) trimethoxysilane (CAS: 2530-83-8).

2. The silicone elastomer of claim 1, wherein the intermediate layer respectively undergoes an addition reaction with the first layer and the second layer.

3. The silicone elastomer of claim 2, wherein an adhesive force between the first layer and the second layer is approximately from 125 N/5 cm to 245 N/5 cm.

4. The silicone elastomer of claim 1, wherein the first layer comprises the isocyanate group, and a double bond of C=N in the isocyanate group in the first layer crosslinks with the intermediate layer via a functional group containing active hydrogen.

5. The silicone elastomer of claim 1, wherein the intermediate layer self-crosslinks via a siloxane functional group.

6. The silicone elastomer of claim 1, wherein, the first layer is polyurethane.

7. The silicone elastomer of claim 1, wherein the intermediate layer is cured by thermal curing or photo-curing.

8. The silicone elastomer of claim 1, wherein the first layer applied with the intermediate layer is baked in a curing apparatus with preheated temperature of approximately 90° C.-130° C. for approximately 5 minutes for crosslinking reaction between the intermediate layer and the first layer.

9. The silicone elastomer of claim 1, wherein the second layer and the intermediate layer are baked in a curing apparatus with preheated temperature of approximately 110° C. for approximately 3 minutes for crosslinking reaction between the intermediate layer and the second layer.

10. The silicone elastomer of claim 1, wherein the silicone rubber has a functional group comprising: SiH or —CH=CH$_2$.

11. The silicone elastomer of claim 10, wherein the second layer crosslinks with the intermediate layer via the functional group comprising: SiH or —CH=CH$_2$.

12. The silicone elastomer of claim 1, wherein an end surface of the first layer is combined with a substrate, wherein the first layer is between the intermediate layer and the substrate.

* * * * *